(12) United States Patent
Vaidya et al.

(10) Patent No.: US 10,069,397 B2
(45) Date of Patent: Sep. 4, 2018

(54) DIGITALLY CONTROLLED ZERO VOLTAGE SWITCHING

(71) Applicant: Intel Corporation, Santa Clara, CA (US)

(72) Inventors: Vaibhav Vaidya, Portland, OR (US); Pavan Kumar, Portland, OR (US); Krishnan Ravichandran, Saratoga, CA (US); Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/757,802

(22) Filed: Dec. 23, 2015

(65) Prior Publication Data

US 2017/0187284 A1 Jun. 29, 2017

(51) Int. Cl.
  *H02M 1/08* (2006.01)
  *H02M 1/38* (2007.01)
  *H02M 3/158* (2006.01)

(52) U.S. Cl.
  CPC ............. *H02M 1/083* (2013.01); *H02M 1/38* (2013.01); *H02M 3/1588* (2013.01); *Y02B 70/1466* (2013.01)

(58) Field of Classification Search
  CPC ............ H02M 3/00; H02M 3/02; H02M 3/04; H02M 3/10; H02M 3/145; H02M 3/155; H02M 3/1552; H02M 3/1555; H02M 3/1557; H02M 3/156; H02M 3/1563; H02M 3/157; H02M 3/158; H02M 3/1582; H02M 3/1588; H02M 2001/0009; H02M 2001/0012; H02M 2001/0032; H02M 2001/0048; H02M 2001/0054;
  (Continued)

(56) References Cited

U.S. PATENT DOCUMENTS

| 5,678,025 A | 10/1997 | Ghori et al. |
| 2006/0152204 A1 | 7/2006 | Maksimovic et al. |

(Continued)

OTHER PUBLICATIONS

A. Peterchev, et al., "Digital Loss-Minimizing Multi-Mode Synchronous Buck Converter Control", IEEE Power Electronics Specialists Conference, 2004, pp. 3694-3699.*

(Continued)

*Primary Examiner* — Timothy J Dole
*Assistant Examiner* — Carlos Rivera-Perez
(74) *Attorney, Agent, or Firm* — Grossman, Tucker, Perreault & Pfleger, PLLC (57) ABSTRACT

Generally, this disclosure describes an apparatus. The apparatus includes switch controller circuitry. The switch controller circuitry includes dead time logic circuitry to determine an estimated dead time interval between a turn off of a first switch and a turn on of a second switch. The first switch and the second switch are coupled at a switched node. The estimated dead time interval is determined based, at least in part, on a difference between an input voltage, Vin, and a switched voltage, Vsw, detected at the switched node just prior to turning off the first switch, a parasitic capacitance, Cpar, associated with the switched node and a maximum inductor current, $I_{L,max}$. The difference between Vin and Vsw represents the maximum inductor current.

19 Claims, 5 Drawing Sheets

(58) Field of Classification Search
CPC .. H02M 2001/0058; H02M 1/00; H02M 1/14; H02M 1/083; H02M 1/38; Y02B 70/1466
USPC ............... 323/222–226, 235–238, 271–278, 323/282–288, 299–303, 351; 363/21.03, 363/123–127
See application file for complete search history.

(56) References Cited

U.S. PATENT DOCUMENTS

| | | |
|---|---|---|
| 2006/0164867 A1 | 7/2006 | Dikken et al. |
| 2008/0224677 A1 | 9/2008 | Kim et al. |
| 2012/0105034 A1 | 5/2012 | Brown et al. |
| 2013/0063984 A1 | 3/2013 | Sandner et al. |
| 2013/0106377 A1* | 5/2013 | Lee ................. H02M 3/157 323/282 |
| 2013/0147451 A1* | 6/2013 | Hagan ............. H02M 3/156 323/282 |
| 2014/0253059 A1* | 9/2014 | Tuten .............. G05F 1/10 323/271 |
| 2015/0222186 A1* | 8/2015 | Holloway ......... H02M 3/158 323/271 |
| 2015/0349640 A1* | 12/2015 | Ito .................. H02M 3/158 323/271 |

OTHER PUBLICATIONS

International Search Report and Written Opinion issued in PCT Application No. PCT/US2016/063689, dated Mar. 9, 2017, 11 pages.

\* cited by examiner

DIGITALLY CONTROLLED ZERO VOLTAGE SWITCHING

FIELD

The present disclosure relates to digital control for zero voltage switching in a switching converter power supply.

BACKGROUND

Inductor-based switching converters, e.g., buck DC-DC converters, can have large voltage swings and pulsed currents at the switch node due to non-ideal circuit characteristics, e.g., parasitics and delays. Such voltage swings and pulsed currents may then cause efficiency loss and/or stress on the associated power switches, e.g., transistors.

"Soft-switching" techniques may provide zero-voltage switching of the power switches of the converter, which generally increase efficiency and reduce stress on the components. Soft-switching techniques typically use analog circuitry that includes sense resistors, current mirrors, snubbers, amplifiers and/or comparators, etc. These analog circuits become challenging to scale and calibrate as high-speed converters are integrated into sub-micron manufacturing processes.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to circuits, systems and methods configured to address challenges related to implementing inductor based DC-DC buck regulators on advanced CMOS (Complementary Metal Oxide Semiconductor) processes. Such inductor based switching converters can have relatively large voltage swings and pulsed currents at the switch node (Vsw) due to parasitics and delays, causing efficiency loss and electrical stress on the power switches. The circuits, systems and methods of the present disclosure, in some embodiments, are configured to provide a digital, standard cell based technique for soft-switching. Thus, implementing the DC-DC regulators in a CMOS process may be facilitated, allowing scaling as the associated process technology scales.

The circuits, systems and methods of the present disclosure, while addressing the challenge of a specific transition (e.g., the switch-node falling edge in a buck converter), can also be utilized for other break-before-make switching transitions.

In operation, during each switching cycle of a buck converter, the high-side switch turns off when the current in the inductor is near-maximum, and the low-side switch turns on to ramp-down the inductor current. The switches have a 'dead-time' between turning off one and turning on the other to prevent short circuiting the input power source. If this dead-time is optimal, a parasitic capacitor at the switching node is discharged automatically and adiabatically by the inductor current. If the dead-time is too short or too long, a spike of current-stress may occur in the low-side switch degrading efficiency. A relatively large voltage swing may occur at the switch node causing voltage stress to all switches. Ensuring an optimal dead-time and avoiding current and/or voltage stress may thus be beneficial.

Circuits, systems, and methods are configured to use a digital delay line to sense a maximum inductor current and latch a digital (e.g., binary) code representing the maximum inductor current just before the high-side switch turns off. This code may then be used during a same PWM (or PFM) cycle to set a high-side-off to low-side-on dead-time. The dead-time is configured to be inversely proportional to the inductor current. The switch node may then discharge adiabatically through the inductor. The proportionality may be adjusted dynamically through an error detection circuit (i.e., delay adjustment logic circuitry). Soft-switching may thus be achieved for the falling edge of the switch node in each cycle even in the presence of PVT (Process, Voltage, Temperature) variation. The circuits, systems, and methods may be implemented without fuses and without test time calibration.

The inductor current may be determined using a "just-in-time" measurement, thus avoiding heuristic estimations or calculations based on history. The circuits, systems, and methods are implemented digitally and may be adjusted based on real-time sensing, thus avoiding calibration operations. Using inductor current information, just-in-time, and a digital implementation may provide improvements over some existing solutions that may rely on inductor-current-modeling or high-speed feedback of switching voltage. Such techniques may be impractical for scaling in a sub-micron manufacturing process.

The logic and circuitry described herein may be embodied as integrated circuit (IC) designs, such as a complementary metal oxide semiconductor (CMOS) design, etc. In other embodiments, the power supply circuitry may be implemented using modular power train integrated circuits (PTICs) with each power supply representing a slice of a common die.

Figure 1:
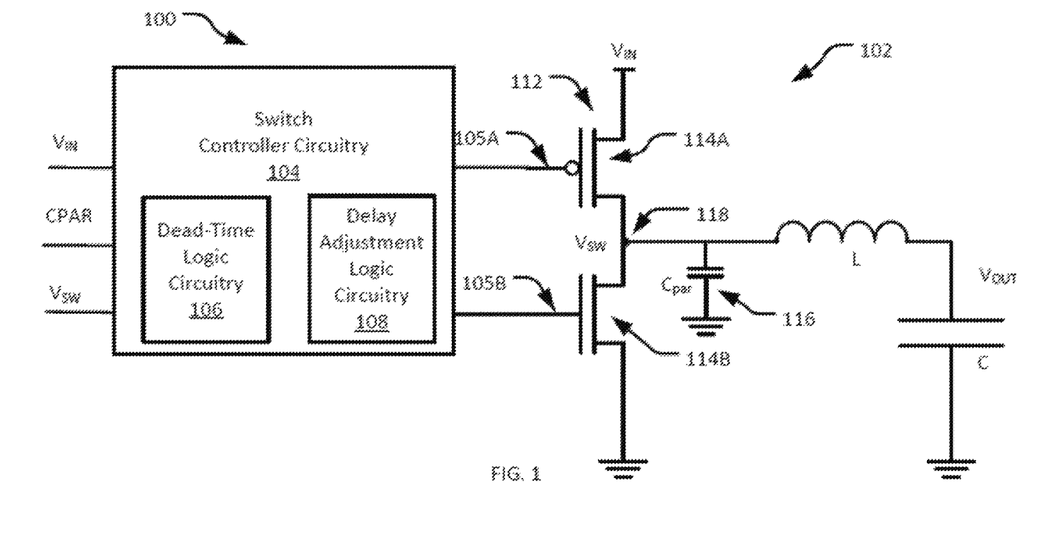
FIG. 1 illustrates a power supply system consistent with various embodiments of the present disclosure.

FIG. 1 illustrates a power supply system 100 consistent with various embodiments of the present disclosure. Power supply system 100 generally includes switch controller circuitry 104 configured to control DC-DC converter circuitry 102. The DC-DC converter circuitry 102, may include a switched DC/DC converter power supply topology, for example, known and/or after-developed switched DC/DC converter topology such as Buck, boost, Buck-boost, SEPIC (single-ended primary inductor converter), Class D, etc.

In the example of FIG. 1, the DC-DC (i.e., DC to DC) converter circuitry 102 is a Buck converter topology that includes a pair of switches, e.g., first switch 114A and second switch 114B (e.g., CMOS switch devices) in a half bridge arrangement 112 coupled between a voltage rail (i.e., supply voltage) Vin and a reference node (e.g., ground). Switch 114A may be referred to herein as the high side switch, and switch 114B may be referred to herein as the low side switch.

The Buck converter topology 102 may also include an output stage that includes inductor circuitry (L) and capacitor circuitry (C). The Buck converter topology 102 may further include a parasitic capacitance 116 with capacitance Cpar to account for non-ideal circuit characteristics of Buck converter 102. Switch 114A may include a P-type switch (e.g., PMOS device) and switch 114B may include an N-type switch (e.g., NMOS device), however, it will be understood that in other embodiments, the switches 114A and 114B may both be NMOS switch devices, PMOS switch devices, and/or the switch 114A may be an NMOS switch device while the switch 114B may be a PMOS switch device.

The parasitic capacitance 116, inductor circuitry (L) and capacitor circuitry (C) may be coupled between the switches 114A and 114B at a switched voltage node 118. A voltage at node 118 may then correspond to Vsw. As used herein, Vsw may refer to the voltage at switched node 118 and/or to the switched node itself 118. Further, the terms "switch node", "switched node" and "switching node" all refer to node 118.

Switch controller circuitry 104 is configured to generate switch control signals 105A and 105B to control the conduction state of each of the switches 114A and 114B to generate an output voltage (Vout) and output current. In some embodiments, the switch controller circuitry 104 may be configured to generate the switch control signals 105A and 105B as pulse width modulation (PWM) signals having a controllable duty cycle to control power delivered to a load (not shown) coupled to Vout. In other embodiments, the switch controller circuitry 104 may be configured to generate the switch control signals 105A and 105B as pulse frequency modulation (PFM) signals having a controllable frequency to control power delivered to a load (not shown) coupled to Vout.

Thus, switch controller circuitry 104 may be configured to sense Vout and/or load current and to adjust the duty cycle and/or frequency accordingly. In the example circuitry of FIG. 1, when the switch control signal 105A is low, the PMOS switch 114A is turned ON (i.e., active low), and when the switch control signal 105B is high, the NMOS switch 114B is turned ON (i.e., active high). Conversely, when the switch control signal 105A is high, the PMOS switch 114A is turned OFF, and when the switch control signal 105B is low, the NMOS switch 114B is turned OFF. To prevent a short circuit and shoot through current from the supply voltage, Vin, to ground the switch controller circuitry 104 may control switch 114A and switch 114B so that there exists a dead time between a turning off of one switch and a turning on of the other switch. Accordingly, the switch controller circuitry 104 may also include dead-time logic circuitry 106 to determine an estimated dead time interval between a turn off of switch 114A and turn on of switch 114B, based on, at least in part, a difference between the input voltage, Vin, and the switched voltage, Vsw, as will be described in greater detail below. "Dead time" or "dead time interval", as used herein, shall refer to the time between a turn off of the high side switch 114A and a turn on of the low side switch 114B.

The dead-time logic circuitry 106 may be configured to determine the dead time interval, T, as:

$$T = C_{par} * V_{in} / I_{L,max},$$

where Cpar is the value of the parasitic capacitance 116, Vin is the voltage value of the supply voltage, and $I_{L,max}$ is a measure of the maximum current in the inductor when the high side switch 114A turns off. In the present disclosure, the value of $I_{L,max}$ may be estimated as a difference between Vin and Vsw.

When the high side switch 114A is turned ON, and Vin is coupled to the inductor L, current is ramped up in the inductor L. Initially, when the high side switch 114A is turned on, the voltage at the switched node Vsw is approximately equal to Vin, but during the on cycle of the high side switch 114A, the voltage Vsw ramps down, generally in inverse proportion to the slope of the ramp up of the inductor current $I_L$. When the high side switch 114A is turned off (by the duty cycle/frequency control of the control signal 105A), the turn off point generally represents maximum current in the inductor L, $I_{L,max}$, and the current in the inductor L begins to ramp down during the dead time interval and continues to ramp down during the on time of the low side switch 114B. Accordingly, the dead time logic circuitry 106 may be configured to determine an estimate of $I_{L,max}$, when the high side switch 114A turns off, based on the value of Vsw at or just before the high side switch 114A is turned off.

The value of Cpar may be an estimated value, and may be estimated based on semiconductor manufacturing processes, semiconductor device tolerances, etc., and/or a user-programmable value that may programmed for a particular semiconductor chip, etc. In at least one embodiment described herein, the circuitry of FIG. 1 may be implemented, in whole or in part, in a semiconductor device such that the value of Cpar may be estimated based on a priori knowledge of the individual semiconductor device parameters, ranges and/or tolerances. However, in some embodiments, the value of Cpar may include an error that results in an error in determining the dead-time interval, T. For example, the value of Cpar may vary with process, voltage and/or temperature variations. Accordingly, in at least one embodiment, the switch controller circuitry 104 may also include delay adjustment logic circuitry 108 configured to adjust the time-time interval, T, as a result of estimation errors, as will be described in greater detail below.

Figure 2:
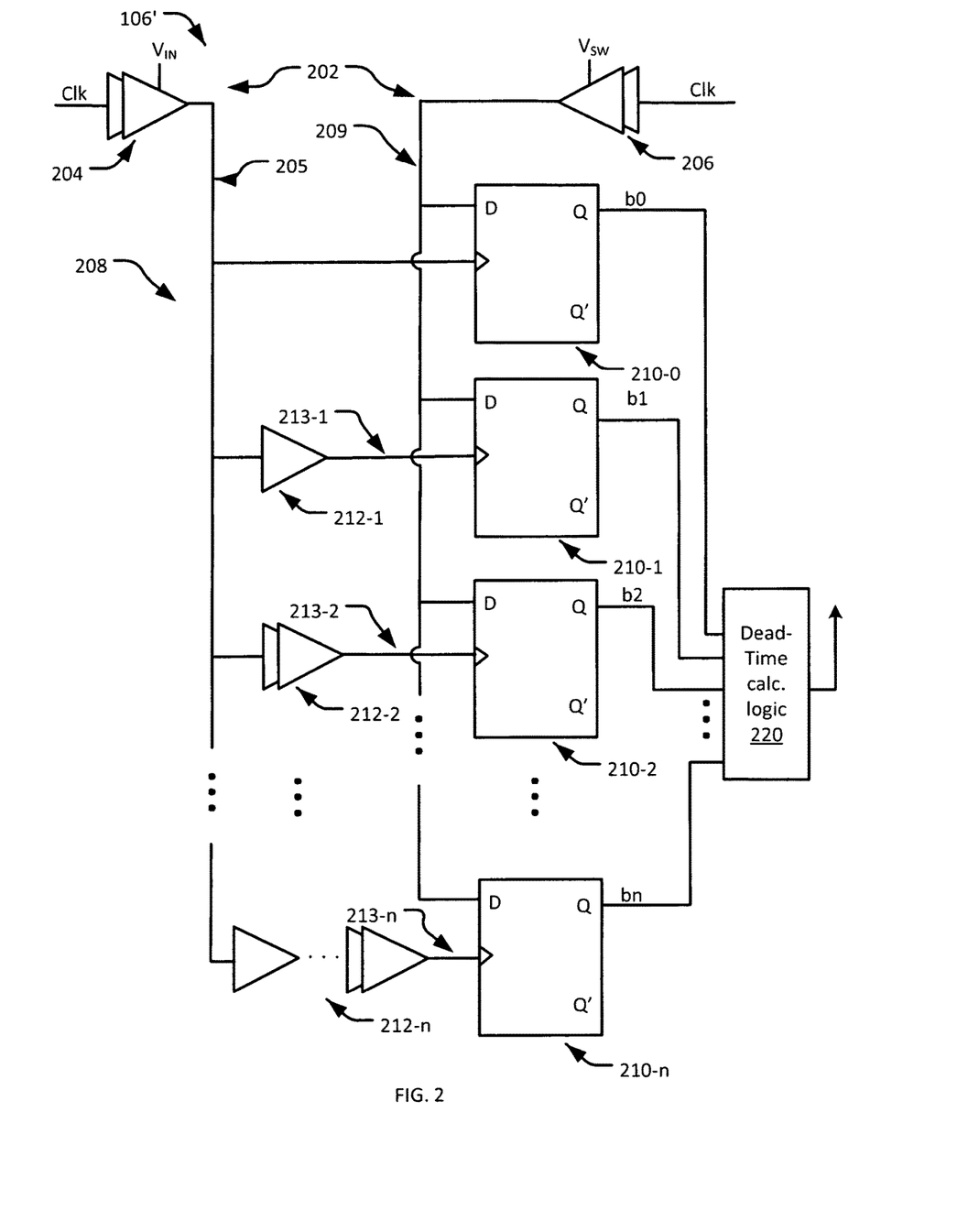
FIG. 2 illustrates an example dead-time logic circuitry according to one example embodiment of the present disclosure.

FIG. 2 illustrates dead-time logic circuitry 106' according to one example embodiment of the present disclosure. The dead time logic circuitry 106' is one example of dead-time logic circuitry 106 of FIG. 1. The dead-time logic circuitry 106' of this embodiment includes differential clocking circuitry 202 and phase comparator circuitry 208. The differential clocking circuitry 202 includes first clocking circuitry 204 configured to clock the input voltage, Vin, and second clocking circuitry 206 configured to clock the switched node voltage, Vsw. For example, the first clocking circuitry 204 and the second clocking circuitry 206 may correspond to delay oscillators. In delay oscillators, a delay, i.e., a phase difference between the input clock signal and the output clock signal, is related to a supply voltage to the delay oscillator. In other words, varying the input voltage (i.e., supply voltage) to the delay oscillator varies the phase difference between an input clock signal and the output clock signal. The clock signal (Clk) input to the first clocking circuitry 202 and the second clocking circuitry 206, in this example, may be generated by, for example, ring oscillator circuitry (not shown) and/or other circuitry configured to provide a relatively stable clock signal.

The first clocking circuitry 204 is configured to generate a first clocked signal 205 having a delay (or phase) relative to the input clock signal, Clk, based on the input voltage, Vin. Thus, if Vin changes, the phase of the first clocked signal 205 relative to input clock signal, Clk, changes proportionally. Similarly, the second clocking circuitry 206 is configured to generate a second clocked signal 209 having a delay (or phase) relative to the input clock signal, Clk, based on the switched voltage, Vsw. Thus, as Vsw changes, the phase of the second clocked signal 209 changes proportionally relative to the input clock signal, Clk. A phase difference, i.e., a delay, between the first clocked signal 205 and the second clocked signal 209 may then correspond to a difference between Vin and Vsw.

As stated above, initially, when the high side switch 114A turns on, the value of Vsw and Vin are approximately equal, and thus, the phase of first clocked signal 205 is approximately equal to the phase of second clocked signal 209 (relative to Clk). In other words, the first clocked signal 205 and the second clocked signal 209 may be generally aligned in time. Vin generally remains relatively constant throughout the on cycle of the high side switch 114A, and thus, as Vsw ramps down during the on cycle of the high side switch 114A, a phase difference between the first clocked signal 205 and the second clocked signal 209 increases. The phase difference is proportional to the voltage difference between Vin and Vsw.

The phase comparator circuitry 208 is generally configured to generate an output binary (i.e., digital) code b0, b1, b2, . . . , bn that corresponds to the phase difference between first and second clocked signals 205, 209, and represents a voltage value of Vsw, that is proportional to the inductor current $I_L$. In the example of FIG. 2, the phase comparator circuitry 208 includes at least one flip-flop circuit 210-0, 210-1, 210-2, . . . , 210-n configured to generate the binary code b0, b1, b2, . . . , bn indicative of, or proportional to, a voltage difference between Vin and Vsw, which is generally proportional to the value of the current, $I_L$, in the inductor L. Each flip-flop circuit 210-0, 210-1, 210-2, . . . , 210-n may be configured as a D-type flip flop. Each flip-flop circuit 210-0, 210-1, 210-2, . . . , 210-n includes a clock input configured to receive the first clocked signal 205 (i.e., clock input of flip-flop circuit 210-0) or a delayed first clocked signal, 210-1, . . . , 210-n. Each flip-flop further includes a D input configured to receive the second clocked signal 209. Generally, an increasing number of flip-flop circuits 210-0, 210-1, 210-2, . . . , 210-n may generate an increased accuracy of the binary code output b0, b1, b2, . . . , bn, at the expense of increased component count and/or complexity. For example, the number of flip-flop circuits may be in the range of 5 to 8.

Phase comparator circuitry 208 may also include offset circuitry 212-1, 212-2, . . . , 212-n, each configured to add a respective additional delay to the first clocked signal 205 prior to provision of the respective delayed clocked signal to the respective flip-flop circuitry 210-1, . . . , 210-n. As a general matter, each offset circuitry 212-1, 212-2, . . . , 212-n is configured to provide increasing delay time such that offset circuitry 212-1 provides the least delay amount (greater than zero) and offset circuitry 212-n provides the most delay amount. Offset circuitry between 212-1 and 212-n, e.g., offset circuitry 212-2, provide a delay amount between the delay of 212-1 and the delay of 212-n. Thus, for example, offset circuitry 212-1 may be configured to generate a first delayed output signal 213-1, where the rising edge of the first delayed output signal 213-1 is delayed compared to the rising edge of first clocked signal 205. The delay time of offset circuitry 212-1 may be selected based on, for example, a desired resolution of the output binary code b0, b1, b2, . . . , bn, a multiple of a fundamental delay unit of an integrated circuit component (e.g., a delay caused by one transistor of an IC, etc.), a preprogrammed and/or user programmable delay period, etc.

In an embodiment, the delay time of each offset circuitry 210-1, . . . , 210-n may be a whole number multiple of a delay increment Δt. The delay increment, Δt, may be related to an incremental voltage ΔV. The delay increment Δt may be selected based on, for example, incremental voltage ΔV and a desired resolution of the output binary code b0, b1, b2, . . . , bn. The incremental voltage ΔV may correspond to a minimum resolution for the difference between Vin and Vsw. In other words, Vin−Vsw=kΔV, where k=0, 1, 2, . . . , n and the delay time may thus correspond to kΔt. ΔV may thus represent a minimum resolution for inductor current, $I_L$. Continuing with this example, offset circuitry 212-1 may be configured to delay first clocked signal 205 by Δt and offset circuitry 212-2 may be configured to delay first clocked signal 205 by 2Δt. Offset circuitry 212-n may then be configured to delay the first clocked signal 205 by nΔt. Each offset circuitry 212-1, 212-2, . . . , 212-n is coupled to a respective D flip-flop 210-1, 210-2, . . . , 210-n clock input. Thus, second clocked signal 209 (corresponding to a data signal for each D flip-flop 210-1, 210-2, . . . , 210-n) is captured (i.e., clocked in) by a respective flip-flop 210-1, 210-2, . . . , 210-n at a corresponding delay time, kΔt (k=1, 2, . . . , n) relative to a rising edge of the first clocked signal 205.

Figure 3:
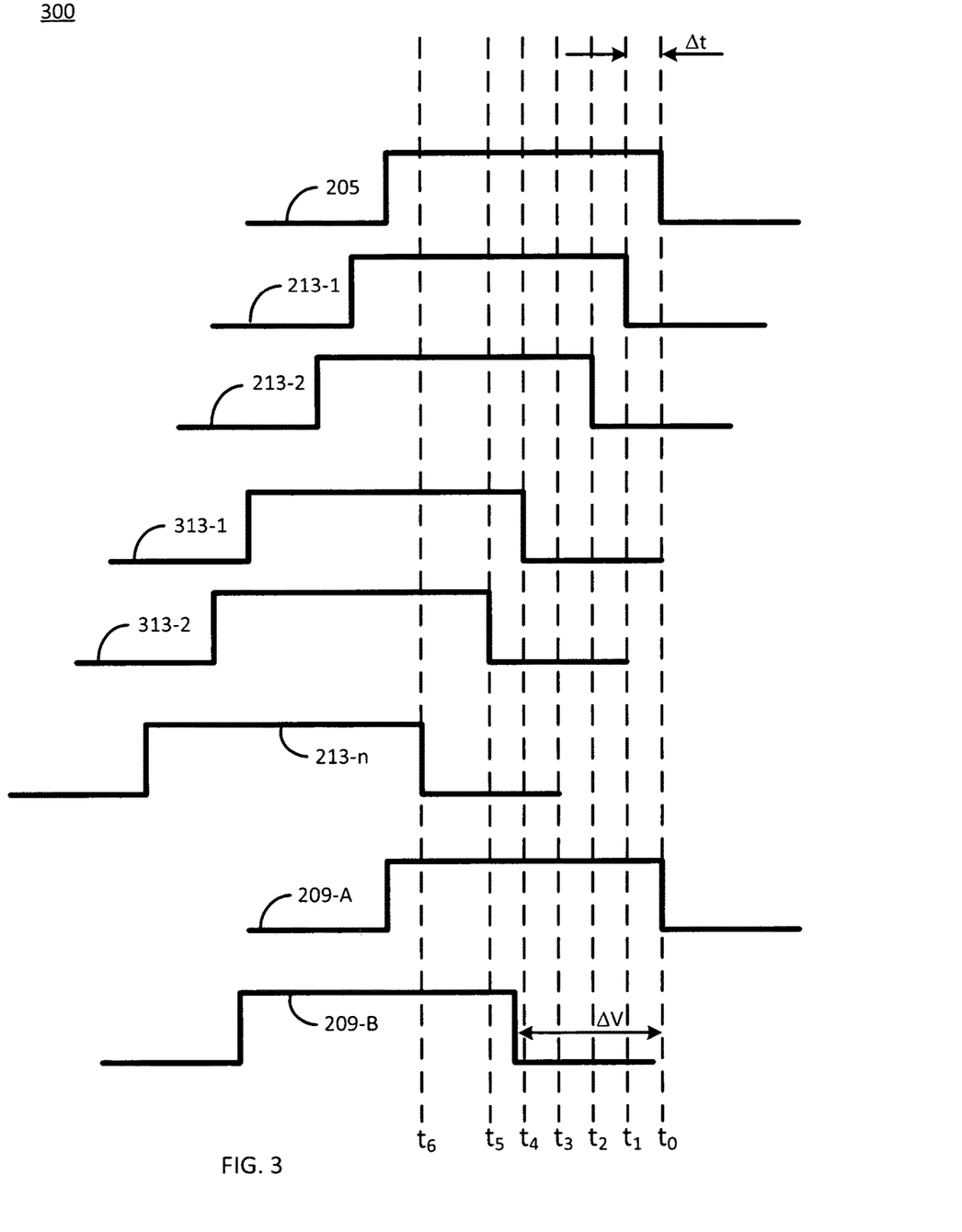
FIG. 3 illustrates a timing (delay) diagram illustrating operation of the dead-time logic circuitry of FIG. 2.

FIG. 3 illustrates a timing (i.e., delay) diagram 300 illustrating operation of the dead-time logic circuitry 106' of FIG. 2. FIG. 3 may be best understood when considered in combination with FIG. 2. FIG. 3 illustrates clocked signals input to the clock inputs of the flip-flops 210-1, . . . , 210-n and two data signals 209-A, 209-B.

The timing diagram 300 includes one pulse of each clocked signal 205, 213-1, . . . , 213-n (and, e.g., 313-1, 313-2) input into the clock input of respective flip-flop circuits 210-0, 210-1, . . . , 210-n. Clocked signals 313-1, 313-2 represent delayed clocked signals (not shown in FIG. 2) that are between 213-2 and 213-n of FIG. 2. The timing diagram further includes one pulse of two examples 209-A, 209-B of second clocked signal 209 representing the second clocked signal 209 at two different points in time during a time period when the high side switch 114A is turned ON. Each time $t_0$, . . . t6 represents a point in time when a rising edge of respective first clocked signal 205 or delayed clock signals 213-1, 213-2, . . . , 213-n, 313-1, 313-2 are incident on a respective D flip-flop 210-0, . . . , 210-n. Thus, adjacent times, $t_i$, $t_{i+1}$ may be separated by delay increment Δt. The period of the clocked signals is less than an associated period of a PWM (or PFM) signal driving the switches 114A, 114B. The D flip-flops 210-0, . . . , 210-n are rising edge triggered, configured to latch a respective value on the D input and to retain the latched value until reset by, e.g., dead-time calculation logic 220. Similar operations may be performed with falling edge triggered flip-flops, resulting in an inverted digital code.

In a first example, clocked signal 209-A corresponds to a first point in time when or just after the high side switch 114A is turned on. In a second example, clocked signal 209-B corresponds to a second point in time sometime after the first point in time. The first example clocked signal 209-A corresponds to Vsw at or near Vin and thus, a delay between first example clocked signal 209-A and first clocked signal 205 is at or near zero. The second example clocked signal 209-B corresponds to Vsw<Vin and, thus, a delay between second example clocked signal 209-B and first clocked signal 205 is greater than zero and proportional to the difference between Vin and Vsw.

Considering first example clocked signal 209-A, at time $t_0$, the rising edge of the first clocked signal 205 reaches the clock input of flip-flop 210-0. If Vin≈Vsw then the rising edge of the first example clocked signal 209-A may arrive at the D input of flip-flop 210-0 at or near $t_0$. Flip-flop 210-0 may then latch a zero or a one depending on how close Vsw is to Vin and any set up time constraints on flip-flop 210-0. b0 may then be a zero or a one.

At time $t_1$, a rising edge of delayed first clocked signal 213-1 arrives at the clock input of flip-flop 210-1. The first example clocked signal 209-A is constant (i.e., high) at time $t_1$. Flip-flop 210-1 may latch a one and, thus, b1 may then be a one. These operations may then be repeated for times $t_2, \ldots, t_6$. After time $t_6$, bits b1, ..., bn of the digital code may all be ones and the bit, b0, may be a zero or a one. Thus, a digital code of all ones may represent Vsw≈Vin.

Turning now to second example clocked signal 209-B, at time to, the rising edge of the first clocked signal 205 reaches the clock input of flip-flop 210-0. Since Vsw is less than Vin in this second example, the second example clocked signal 209-B that is incident to the data input to flip-flop 210-0, may be zero. Flip-flop 210-0 may latch a zero and, thus, b0 may then be a zero.

For times $t_1$, $t_2$, $t_3$, and $t_4$, second example clocked signal 209-B that is incident to the D input of flip-flop 210-0 may remain zero. At time $t_1$, the rising edge of delayed first clocked signal 213-1 arrives at the clock input of flip-flop 210-1. Flip-flop 210-1 may latch a zero and, thus, b1 may be a zero. Similarly, flip-flop 210-2 may latch a zero at time $t_2$. At time $t_4$, a rising edge of delayed first clocked signal 313-1 may arrive at a clock input of a corresponding flip-flop and a zero may be latched, as described herein. A time interval between $t_4$ and $t_0$ may then correspond to kΔt, k between 2 and n, in this example.

Between times $t_4$ and $t_5$, the rising edge of second example clocked signal 209-B arrives at the D input of all of the flip-flops 210-0, . . . , 210-n. The D input to flip-flops 210-0, . . . , 210-n may then remain high for the remainder of the pulse of second example clocked signal 209-B. Bits b0, b1, . . . bk may remain at zero since, although the data input has changed, the corresponding clock input of each flip-flop has not received a rising edge.

At time $t_5$, the rising edge of delayed clocked signal 313-2 may arrive at a clock input of a corresponding flip-flop and a one may be latched, as described herein. A time interval between $t_0$ and $t_5$ may then correspond to (k+1)Δt. Thus, following time $t_5$, bits $b_0, \ldots, b_k$ of the binary code may be zero and bit $b_{k+1}$ may be one.

The sequence may continue through time $t_6$ when the rising edge of delayed clock signal 213-n arrives at the clock input of the flip-flop 210-n. Flip-flop 210-n may then latch a one. Thus, following time $t_6$, bits $b_0, \ldots, b_k$ of the digital code may be zero and bits $b_{k+1}, \ldots, b_n$ of the digital code may be one. The digital code $b_0, \ldots, b_n$ may then represent a difference between Vin and Vsw. A relatively larger voltage differential (Vin−Vsw) may then be represented by a relatively lesser digital code.

Thus, for each time period of first clocked signal 205 and/or maximum delay nΔt, a binary code may be determined that corresponds to a voltage difference between Vin an Vsw. A resolution associated with the voltage is related to a frequency (and period) of clock signal Clk and a duration of the delay increment Δt.

Dead time calculation logic 220 is configured to capture the digital code during the time interval that the high side switch is turned on up to, or just prior to, the a point at which high side switch 114A is turned off by the switch controller circuitry 104. Dead time calculation logic may then determine T based, at least in part, on the captured digital code (that represents $I_{L,max}$), Vin and Cpar. Switch controller circuitry 104 may then be configured to delay turning on the low side switch 114B after turning off the high side switch 114A for a time period that corresponds to T. Switch controller circuitry 104 may implement the delay corresponding to the estimate, T, in a same PWM (or PFM) cycle as dead time calculation logic determined the estimate, T. The capturing, calculating and delaying may be repeated for each cycle of the PWM (or PFM) signal. Thus, variation in inductor current with load may be accommodated and efficiency degradation and/or switch stress may be avoided.

In some situations, there may be error in the determined dead time that may vary over time. For example, the determined estimated dead time may not be long enough or the determined estimated dead time may be too long. In other words, the determined estimated dead time interval may be less than or greater than an optimal dead time interval. The optimal dead time corresponds to a duration of the time interval between the high side switch 114A control input signal 105A changing state to turn switch 114A off and Vsw reaching zero. If the dead time interval is too short, the low side switch 114B may be turned on before Vsw=0, i.e., while Vsw>0. If the dead time interval is too long, then Vsw may reach zero and remain at zero for a time period. Non optimal dead time intervals may thus result in stress to switches and/or degraded efficiency.

The optimal dead time interval may vary with process, voltage, temperature, age, etc. Thus, a dead time T, determined based, at least in part, on a detected Vsw (configured to represent $I_{L,max}$) may not always correspond to the optimal dead time. Detecting existing conditions may facilitate adjusting T to account for variation in the optimal dead time interval. Delay adjustment logic circuitry 108 is configured to detect such "error" in the dead time determination and to adjust the dead time interval.

Figure 4:
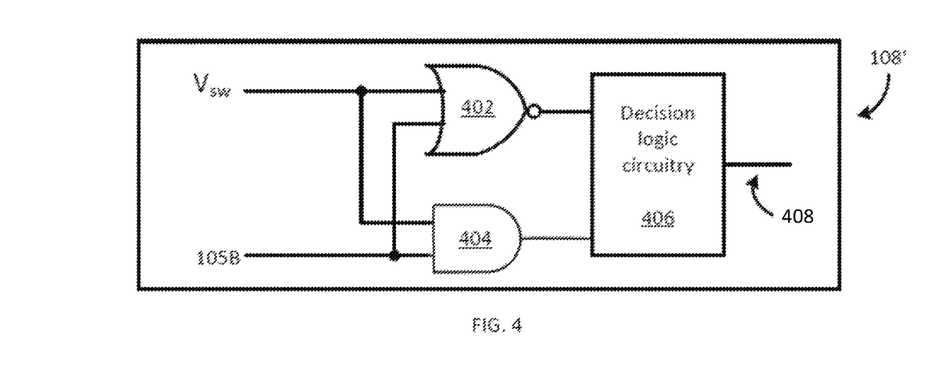
FIG. 4 illustrates an example delay adjustment logic circuitry according to one example embodiment of the present disclosure.

FIG. 4 illustrates an example delay adjustment logic circuitry 108' according to one example embodiment of the present disclosure. Delay adjustment logic circuitry 108' is one example of delay adjustment logic circuitry 108 of FIG. 1. Delay adjustment logic circuitry 108' includes a NOR gate 402, an AND gate 404 and decision logic circuitry 406. Delay adjustment logic circuitry 108' is configured to receive Vsw and low side switch control input 105B and two provide as output a delay adjustment signal 408.

A dead time longer than optimal may degrade efficiency. For example, switching frequency may be unnecessarily reduced while node Vsw remains at zero volts. A dead time that is not long enough may result in turning on the low side switch 114B before the voltage, Vsw, at the switched node reaches zero. Delay adjustment logic circuitry 108' may thus be configured to detect a non-optimal dead time.

NOR gate 402 is configured to detect a dead time longer than the optimal dead time, i.e., Vsw has fallen to zero but the low side switch has not turned on. An output of NOR gate 402 is configured to be a logic one (i.e., high) if both Vsw and low side switch control input 105B are low, i.e., zero, and a logic zero otherwise. Thus, a NOR gate output of logic 1 corresponds to a dead time longer than optimal.

AND gate 404 is configured to detect a dead time that is not long enough, i.e., Vsw is not equal to zero but low side switch 114B is turned on. An output of AND gate 404 is configured to be a logic one if both Vsw and the low side switch control input 105B are high and logic zero otherwise. Thus, an AND gate output of logic 1 corresponds to a dead time that is not long enough.

If respective outputs of both NOR gate 402 and AND gate 404 are zero, then either Vsw is high (i.e., not zero) or low side switch control input 105B is high, e.g., low side switch 114B is on, but not both. In other words, if the respective outputs of both NOR gate 402 and AND gate 404 are zero, maintaining low side switch in the off state is appropriate, and no adjustment to the dead time should be made. If the outputs of both NOR gate 402 and AND gate 404 are high, then an error condition is indicated. In other words, the outputs of both NOR gate 402 and AND gate 404 being high signals that the dead time interval is both too short and too long, an impossible condition.

Decision logic circuitry 406 is configured to receive the outputs of NOR gate 402 and AND gate 404. Decision logic circuitry 406 may then be configured to generate output signal 408 based, at least in part, on the output of NOR gate 402 and based, at least in part, on the output of AND gate 404. The output signal is configured to indicate whether the detected dead time interval is optimum, too long (i.e., determined dead time interval greater than optimum) or not long enough(i.e., determined dead time interval less than optimum). The output signal 408 may be provided to dead time logic circuitry 106 and/or switch controller logic 104. The dead time may then be adjusted accordingly.

Figure 5:
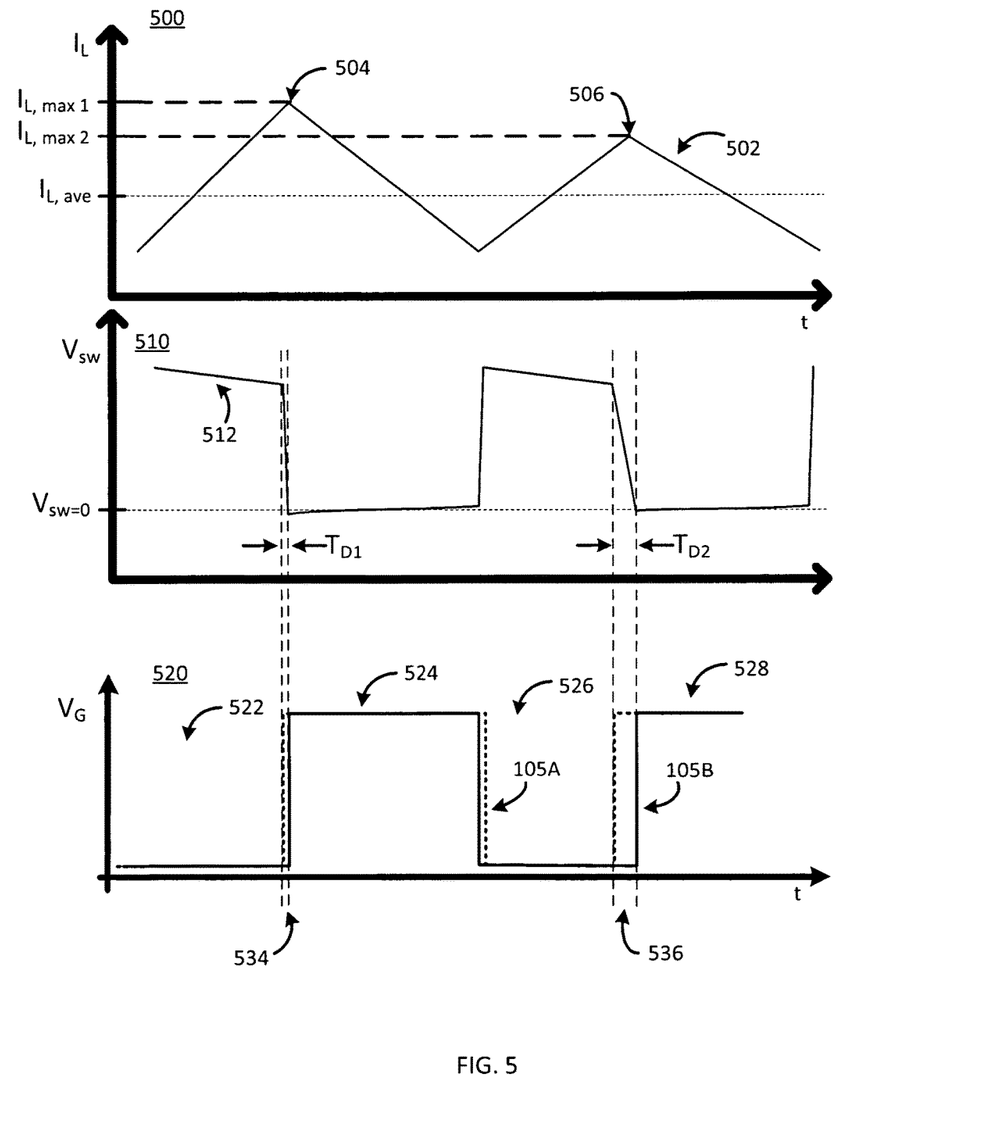
FIG. 5 includes plots illustrating inductor current, switch node voltage and switch control signals consistent with various embodiments of the present disclosure.

FIG. 5 includes plots 500, 510, 520 illustrating inductor current, switch node voltage and switch control signals, respectively, consistent with various embodiments of the present disclosure. For all three plots 500, 510, 520, the horizontal axis corresponds to time and the three plots are generally aligned in time. The plots 500, 510, 520 include a plurality of time intervals that are illustrated in plot 520, relative to the input states, i.e., control input signals 105A, 105B, of switched 114A, 114B, respectively. The time intervals correspond to switch 114A, 114B and thus, to control input 105A, 105B states and dead time intervals. The high side switch 114A is turned on for intervals 522, 526 and the low side switch 114B is turned on for intervals 524, 528. Plot 520 further illustrates a first dead time 534 and a second dead time 536. The first dead time interval 534 corresponds to a first switching interval, $T_{D1}$, and the second dead time interval 536 corresponds to a second switching interval, $T_{D2}$, as described herein.

Plot 500 illustrates inductor current 502 over a plurality of PWM periods. The inductor current ramps up to a first peak 504 during time interval 522, ramps down to a minimum during intervals 534 and 524, ramps up to a second peak 506 during time interval 526 and ramps down again during time intervals 536 and 528. A value of the first peak 504 corresponds to $I_{L,max1}$ and a value of the second peak 506 corresponds to $I_{L,max2}$. $I_{L,max1}$ is greater than $I_{L,max2}$ in this example $I_{L,max1}$ and $I_{L,max2}$ represent different load conditions on DC-DC converter circuitry 102 of FIG. 1.

Plot 510 includes switch node voltage, Vsw, waveform 512. Vsw ramps down as the inductor current ramps up to the first peak 504 during time interval 522, switches to zero over a first switching interval, $T_{D1}$, (i.e., time interval 534) and remains at zero as the inductor current ramps down during time interval 524, switches to high, ramps down as the inductor current ramps up to the second peak 506 during time interval 526, switches to zero over a second switching interval, $T_{D2}$, (i.e., time interval 536) and remains at zero as the inductor current ramps down during time interval 528. As described herein, a duration of the first switching interval, $T_{D1}$, is less than a duration of the second switching interval, $T_{D2}$, when the corresponding first peak 504 inductor current (e.g., $I_{L,max1}$) is greater than the corresponding second peak 506 inductor current (e.g., $I_{L,max2}$).

Plot 520 illustrates the high side switch 114A control input (i.e., gate voltage, $V_G$) signal 105A and the low side switch 114B control input signal 105B. Switch controller circuitry 104 is configured to delay turning on the low side switch 114B after turning off the high side switch 114A for the respective dead times 534, 536. In other words, switch controller circuitry 104 may receive a first dead time interval duration value from dead time logic circuitry 106. Dead time logic circuitry 106 may determine the first dead time interval based, at least in part, on a digital code that corresponds to the first peak inductor current 504, as described herein. Switch controller circuitry 104 may then delay turning on the low side switch 114B after turning off the high side switch 114A for the first dead time interval 534. Dead time logic circuitry 106 may then determine the second dead time interval based, at least in part, on a second digital code that corresponds to the second peak inductor current 506. Switch controller circuitry 104 may then delay turning on the low side switch 114B after turning off the high side switch 114A or the second dead time interval 536.

The dead time interval provided by, i.e., acquired from, dead time logic circuitry may be adjusted based, at least in part, on an input from delay adjustment logic circuitry 108, 108', i.e., output signal 408. Thus, effects of the parasitic capacitance Cpar may be mitigated and the low side switch 114B may not be turned on until the switch node voltage, Vsw, has reached zero.

Thus, a dead time between turning off a high side switch and turning on a low side switch in a DC-DC Buck converter may be determined based, at least in part, on an inductor current. The nominal dead time is related to parasitic capacitance, Cpar, associated with switched node Vsw, supply voltage, Vin, and maximum inductor current, just before the high side switch is turned off. The maximum inductor current may be determined during each PWM (or PFM) cycle, the dead time interval, T, determined, as described herein, may be utilized to set the dead time for a same PWM cycle.

The peak inductor current, $I_{L,max}$, is determined based, at least in part, on a difference between Vin and Vsw. The differential between Vin and Vsw may be determined using, inter alia, a delay oscillator, a plurality of D flip-flops and a plurality of offset circuitries, e.g., delay stages. The difference between Vin and Vsw may then correspond to a digital code. A resolution of the $I_{Lmax}$ value is related to the number of bits in the digital code and, thus, the number of D flip-flops and the number of offset circuitries. Thus, the dead time logic circuitry may be implemented using digital components facilitating implementation in a digital manufacturing process.

The dead time interval may be further monitored by, e.g., delay adjustment logic circuitry, and the dead time interval may be lengthened or shortened based, at least in part, on the result. The delay adjustment logic circuitry may be similarly implemented using digital components.

Figure 6:
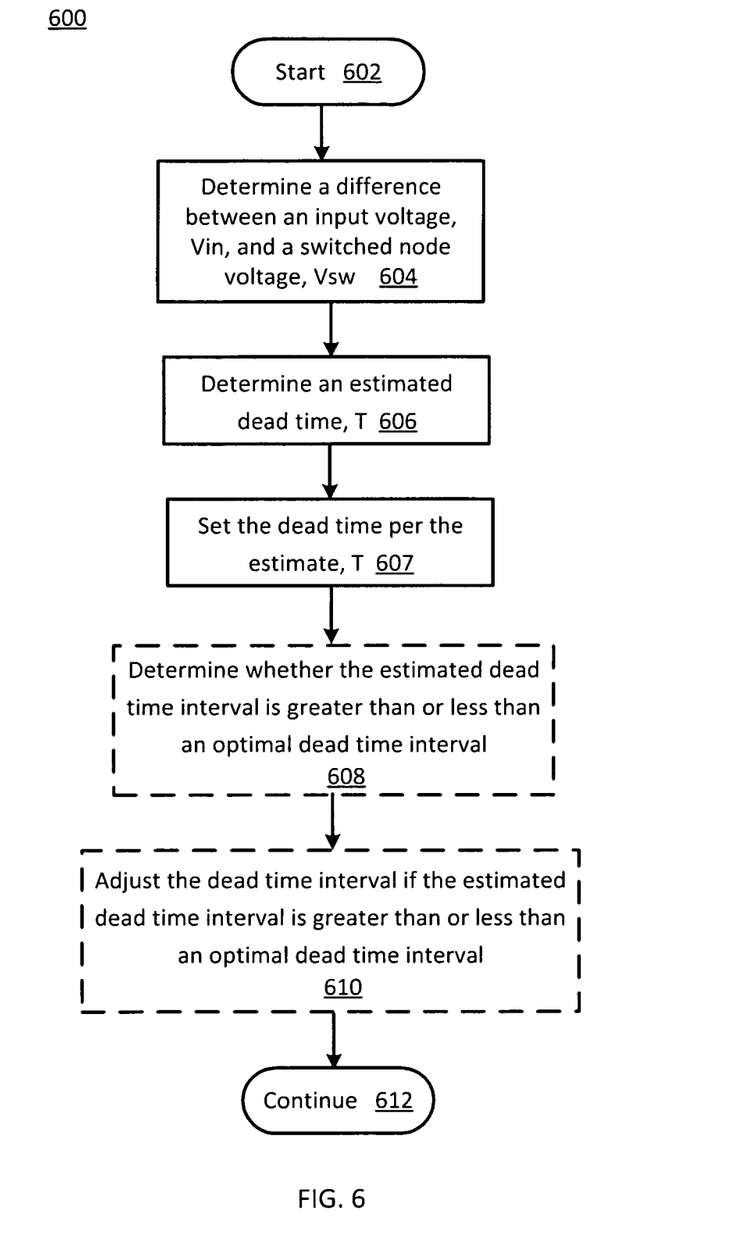
FIG. 6 is a flowchart of zero voltage switching operations according to one embodiment of the present disclosure.

FIG. 6 is a flowchart of zero voltage switching operations 600 according to one embodiment of the present disclosure. In particular, the flowchart 600 illustrates one example embodiment of operations for determining an estimated dead time interval, T, between a turn off of a first switch (e.g., high side switch 114A) and a turn on of a second switch (e.g., low side switch 114B). The operations of flowchart 600 may be performed, for example, by dead time logic circuitry 106, 106' and/or delay adjustment logic circuitry 108, 108' of FIGS. 1, 2 and/or 4.

Operations of this embodiment may begin with start 602. A difference between an input voltage, Vin, and a switched node voltage, Vsw, may be determined at operation 604. For example, the voltage difference may correspond to a phase difference (i.e., delay) between a first clocked signal and a second clocked signal. The relative phases of the clocked signals may be relative to an input clock signal, Clk. An estimated dead time, T, may be determined at operation 606. The estimated dead time, T, may be determined based, at least in part, on the input voltage, the differential voltage and a parasitic capacitance, Cpar. The differential voltage may be related to a maximum inductor current, as described herein. The dead time may be set per the estimate, T, at operation 607. The estimated dead time may then be utilized to set a high side off to low side on dead time for a same PWM cycle.

In some embodiments, whether the estimated dead time interval is greater than or less than an optimal dead time interval may be determined at operation 608. For example, whether the estimated dead time interval is greater than or less than an optimal dead time interval may be determined based, at least in part, on the switched voltage and based, at least in part, on a control input to the low side switch. If the estimated dead time interval is greater than or less than an optimal dead time interval, the dead time interval may be adjusted at operation 610. Operations 608 and 610 may be performed in a next PWM cycle relative to operations 604 and 606. Program flow may then continue at operation 612. Thus, an estimated dead time interval may be determined.

While the flowcharts of FIG. 6 illustrates operations according to various embodiments, it is to be understood that not all of the operations depicted in FIG. 6 are necessary for other embodiments. In addition, it is fully contemplated herein that in other embodiments of the present disclosure, the operations depicted in FIG. 6, and/or other operations described herein may be combined in a manner not specifically shown in any of the drawings, and such embodiments may include less or more operations than are illustrated in FIG. 6. Thus, claims directed to features and/or operations that are not exactly shown in one drawing are deemed within the scope and content of the present disclosure.

Memory may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a system that includes one or more storage devices having stored thereon, individually or in combination, instructions that when executed by one or more processors perform the methods. The processor may include, for example, a processing unit and/or programmable circuitry. The storage device may include a machine readable storage medium including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

Thus, a system, method and apparatus, as described herein, are configured to implement zero voltage switching. An estimate of a dead time between turning off a high side switch and turning on a low side switch in a DC-DC Buck converter may be determined based, at least in part, on an inductor current. The peak inductor current, $I_{L,max}$, is determined based, at least in part, on a difference between Vin and Vsw. The differential between Vin and Vsw may be determined using, inter alia, a delay oscillator, a plurality of D flip-flops and a plurality of offset circuitries, e.g., delay stages. The difference between Vin and Vsw may then correspond to a digital code. A resolution of the $I_{Lmax}$ value is related to the number of bits in the digital code and, thus, the number of D flip-flops and the number of offset circuitries. Thus, the dead time logic circuitry may be implemented using digital components facilitating implementation in a digital manufacturing process.

The dead time interval may be further monitored by, e.g., delay adjustment logic circuitry, and the dead time interval may be lengthened or shortened based, at least in part, on the result. The delay adjustment logic circuitry may be similarly implemented using digital components.

EXAMPLES

Examples of the present disclosure include subject material such as a method, means for performing acts of the method, a device, at least one machine-readable medium, including instructions that when performed by a machine cause the machine to perform acts of the method, or of an apparatus or system to implement zero voltage switching as discussed below.

Example 1

According to this example, there is provided an apparatus. The apparatus includes switch controller circuitry. The switch controller circuitry includes dead time logic circuitry to determine an estimated dead time interval between a turn off of a first switch and a turn on of a second switch. The first switch and the second switch are coupled at a switched node. The estimated dead time interval is determined based, at least in part, on a difference between an input voltage, Vin, and a switched voltage, Vsw, detected at the switched node just prior to turning off the first switch, a parasitic capacitance, Cpar, associated with the switched node and a maximum inductor current, $I_{L,max}$. The difference between Vin and Vsw represents the maximum inductor current.

Example 2

This example includes the elements of example 1, wherein the dead time logic circuitry includes differential clocking circuitry and phase comparator circuitry, the differential clocking circuitry to receive the input voltage and the switched voltage as inputs and to provide a first clocked signal and a second clocked signal as outputs, a phase difference between the first clocked signal and the second clocked signal representing the difference between Vin and Vsw, the phase comparator circuitry to determine the phase difference.

Example 3

This example includes the elements of example 2, wherein the phase comparator circuitry includes a first plurality of D flip flops and a second plurality of offset circuitries.

Example 4

This example includes the elements of example 1 or 2, wherein the dead time is determined as T=Cpar*Vin/$I_{L,max}$, and $I_{L,max}$ corresponds to the maximum inductor current just prior to the first switch turning off, $I_{L,max}$ estimated based, at least in part, on the difference between Vin and Vsw and the switch controller circuitry is to set a dead time to the estimate in a same PWM (pulse width modulation) cycle as the estimated dead time interval was determined.

Example 5

This example includes the elements of example 2, wherein an output of the phase comparator circuitry is a digital code corresponding to the phase difference.

Example 6

This example includes the elements of example 1 or 2, wherein the switch controller circuitry further includes delay adjustment logic circuitry to determine whether the estimated dead time interval is greater than or less than an optimal dead time interval based, at least in part, on the switched voltage and based, at least in part, on a control input to the second switch.

Example 7

This example includes the elements of example 6, wherein the delay adjustment logic circuitry includes a NOR gate to detect whether the estimated dead time interval is greater than the optimal dead time interval and an AND gate to detect whether the estimated time interval is less than the optimal dead time interval.

Example 8

This example includes the elements of example 1 or 2, wherein the first switch is a high side switch and the second switch is a low side switch in a DC to DC converter.

Example 9

This example includes the elements of example 2, wherein the differential clocking circuitry includes a first clocking circuitry to clock the input voltage and a second clocking circuitry to clock the switched node voltage.

Example 10

This example includes the elements of example 3, wherein the offset circuitries are to add an additional delay to the first clocked signal.

Example 11

This example includes the elements of example 3, wherein a respective delay time of at least some offset circuitries of the plurality of offset circuitries is a respective whole number multiple of a delay increment Δt.

Example 12

This example includes the elements of example 11, wherein the delay increment is related to a minimum resolution for the difference between Vin and Vsw.

Example 13

According to this example, there is provided a method. The method includes determining, by dead time logic circuitry, an estimated dead time interval between a turn off of a first switch and a turn on of a second switch. The first switch and the second switch are coupled at a switched node. The estimated dead time interval is determined based, at least in part, on a difference between an input voltage, Vin, and a switched voltage, Vsw, detected at the switched node just prior to turning off the first switch, a parasitic capacitance, Cpar, associated with the switched node and a maximum inductor current, $I_{L,max}$. The difference between Vin and Vsw representing the maximum inductor current.

Example 14

This example includes the elements of example 13, further including receiving, by differential clocking circuitry, the input voltage and the switched voltage as inputs; providing, by the differential clocking circuitry, a first clocked signal and a second clocked signal as outputs; and determining, by phase comparator circuitry, a phase difference between the first clocked signal and the second clocked signal, the phase difference representing the difference between Vin and Vsw.

Example 15

This example includes the elements of example 14, wherein the phase comparator circuitry includes a first plurality of D flip flops and a second plurality of offset circuitries.

Example 16

This example includes the elements of example 13, further including setting, by the switch controller circuitry a dead time to the estimate in a same PWM (pulse width modulation) cycle as the estimated dead time interval was determined, the estimated dead time determined as T=Cpar*Vin/$I_{L,max}$, and $I_{L,max}$ corresponds to the maximum inductor current just prior to the first switch turning off, $I_{L,max}$ estimated based, at least in part, on the difference between Vin and Vsw.

Example 17

This example includes the elements of example 14, wherein an output of the phase comparator circuitry is a digital code corresponding to the phase difference.

Example 18

This example includes the elements of example 13, further including determining, by delay adjustment logic circuitry, whether the estimated dead time interval is greater than or less than an optimal dead time interval based, at least in part, on the switched voltage and based, at least in part, on a control input to the second switch.

Example 19

This example includes the elements of example 18, further including detecting, by a NOR gate, whether the estimated dead time interval is greater than the optimal dead time interval and detecting, by an AND gate, whether the estimated time interval is less than the optimal dead time interval.

Example 20

This example includes the elements of example 12, wherein the first switch is a high side switch and the second switch is a low side switch in a DC to DC converter.

Example 21

This example includes the elements of example 14, further including clocking, by a first clocking circuitry, the input voltage and clocking, by a second clocking circuitry, the switched node voltage.

Example 22

This example includes the elements of example 15, wherein the offset circuitries are to add an additional delay to the first clocked signal.

Example 23

This example includes the elements of example 15, wherein a respective delay time of at least some offset circuitries of the plurality of offset circuitries is a respective whole number multiple of a delay increment Δt.

Example 24

This example includes the elements of example 23, wherein the delay increment is related to a minimum resolution for the difference between Vin and Vsw.

Example 25

According to this example, there is provided a system. The system includes DC to DC converter circuitry; and switch controller circuitry. The switch controller circuitry includes dead time logic circuitry to determine an estimated dead time interval between a turn off of a first switch and a turn on of a second switch. The first switch and the second switch are coupled at a switched node. The estimated dead time interval is determined based, at least in part, on a difference between an input voltage, Vin, and a switched voltage, Vsw, detected at the switched node just prior to turning off the first switch, a parasitic capacitance, Cpar, associated with the switched node and a maximum inductor current, $I_{L,max}$. The difference between Vin and Vsw representing the maximum inductor current.

Example 26

This example includes the elements of example 25, wherein the dead time logic circuitry includes differential clocking circuitry and phase comparator circuitry, the differential clocking circuitry to receive the input voltage and the switched voltage as inputs and to provide a first clocked signal and a second clocked signal as outputs, a phase difference between the first clocked signal and the second clocked signal representing the difference between Vin and Vsw, the phase comparator circuitry to determine the phase difference.

Example 27

This example includes the elements of example 26, wherein the phase comparator circuitry includes a first plurality of D flip flops and a second plurality of offset circuitries.

Example 28

This example includes the elements of example 25 or 26, wherein the dead time is determined as T=Cpar*Vin/$I_{L,max}$, and $I_{L,max}$ corresponds to the maximum inductor current just prior to the first switch turning off, $I_{L,max}$ estimated based, at least in part, on the difference between Vin and Vsw and the switch controller circuitry is to set a dead time to the estimate in a same PWM (pulse width modulation) cycle as the estimated dead time interval was determined.

Example 29

This example includes the elements of example 26, wherein an output of the phase comparator circuitry is a digital code corresponding to the phase difference.

Example 30

This example includes the elements of example 25 or 26, wherein the switch controller circuitry further includes delay adjustment logic circuitry to determine whether the estimated dead time interval is greater than or less than an optimal dead time interval based, at least in part, on the switched voltage and based, at least in part, on a control input to the second switch.

Example 31

This example includes the elements of example 30, wherein the delay adjustment logic circuitry includes a NOR gate to detect whether the estimated dead time interval is greater than the optimal dead time interval and an AND gate to detect whether the estimated time interval is less than the optimal dead time interval.

Example 32

This example includes the elements of example 25 or 26, wherein the first switch is a high side switch and the second switch is a low side switch in the DC to DC converter.

Example 33

This example includes the elements of example 26, wherein the differential clocking circuitry includes a first clocking circuitry to clock the input voltage and a second clocking circuitry to clock the switched node voltage.

Example 34

This example includes the elements of example 27, wherein the offset circuitries are to add an additional delay to the first clocked signal.

Example 35

This example includes the elements of example 27, wherein a respective delay time of at least some offset circuitries of the plurality of offset circuitries is a respective whole number multiple of a delay increment $\Delta t$.

Example 36

This example includes the elements of example 35, wherein the delay increment is related to a minimum resolution for the difference between Vin and Vsw.

Example 37

According to this example, there is provided a system including at least one device arranged to perform the method of any one of claims 13 to 24.

Example 38

According to this example, there is provided a device including means to perform the method of any one of claims 13 to 24.

Example 39

According to this example, there is provided a computer readable storage device having stored thereon instructions that when executed by one or more processors result in the following operations including: the method according to any one of claims 13 to 24.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
    switch controller circuitry to control a conduction state of a first switch and a second switch in a DC to DC converter; and
    dead time logic circuitry to determine an estimated dead time interval between a turn off of the first switch and a turn on of the second switch, the first switch and the second switch coupled at a switched node, wherein the estimated dead time interval is determined based, at least in part, on:
        a difference between an input voltage (Vin) and a switched voltage (Vsw) detected at the switched node just prior to turning off the first switch, wherein Vin and Vsw are differentially clocked by differential clocking circuitry in the apparatus;
        a parasitic capacitance(Cpar) associated with the switched node, wherein Cpar is estimated based on the apparatus configuration or by delay adjustment logic circuitry in the apparatus; and
        a maximum inductor current ($I_{L,max}$), the difference between Vin and Vsw representing the maximum inductor current, wherein $I_{L,max}$ is determined based on a digital code generated by dead time calculation circuitry in the apparatus,
    wherein the dead time logic circuitry comprises the differential clocking circuitry and phase comparator circuitry, the differential clocking circuitry to receive the input voltage and the switched voltage as inputs and to provide a first clocked signal and a second clocked signal as outputs, a phase difference between the first clocked signal and the second clocked signal representing the difference between Vin and Vsw, the phase comparator circuitry to determine the phase difference,
    wherein the phase comparator circuitry comprises a first plurality of D flip flops and a second plurality of offset circuitries, each of offset circuities in the second plurality of offset circuitries configured to incrementally add additional delay to the first clocked signal prior to provision of a respective delayed clock signal to a respective D flip flop.

2. The apparatus of claim 1, wherein the estimated dead time interval is determined as $T=Cpar*Vin/I_{L,max}$, wherein $I_{L,max}$ corresponds to the maximum inductor current just prior to the first switch turning off, $I_{L,max}$ is estimated based, at least in part, on the difference between Vin and Vsw, and the switch controller circuitry is to set a dead time to the estimate in a same PWM (pulse width modulation) cycle as the estimated dead time interval was determined.

3. The apparatus of claim 1, wherein an output of the phase comparator circuitry is a digital code corresponding to the phase difference.

4. The apparatus of claim 1, wherein the switch controller circuitry further comprises the delay adjustment logic circuitry to determine whether the estimated dead time interval is greater than or less than an optimal dead time interval based, at least in part, on the switched voltage and based, at least in part, on a control input to the second switch.

5. The apparatus of claim 4, wherein the delay adjustment logic circuitry comprises a NOR gate to detect whether the estimated dead time interval is greater than the optimal dead time interval and an AND gate to detect whether the estimated dead time interval is less than the optimal dead time interval.

6. The apparatus of claim 1, wherein a respective delay time of at least some offset circuitries of the plurality of offset circuitries is a respective whole number multiple of a delay increment $\Delta t$.

7. The apparatus of claim 6, wherein the delay increment is related to a minimum resolution for the difference between Vin and Vsw.

8. A method comprising:
controlling, by switch controller circuitry, a conduction state of a first switch and a second switch in a DC to DC converter; and
determining, by dead time logic circuitry, an estimated dead time interval between a turn off of the first switch and a turn on of the second switch, the first switch and the second switch coupled at a switched node, the estimated dead time interval determined based, at least in part, on
a difference between an input voltage (Vin) and a switched voltage (Vsw) detected at the switched node just prior to turning off the first switch, wherein Vin and Vsw are differentially clocked by differential clocking circuitry in an apparatus; a parasitic capacitance(Cpar) associated with the switched node, wherein Cpar is estimated based on the apparatus configuration or by delay adjustment logic circuitry in the apparatus; and a maximum inductor current ($I_{L,max}$), the difference between Vin and Vsw representing the maximum inductor current, wherein $I_{L,max}$ is determined based on a digital code generated by dead time calculation circuitry in the apparatus;
receiving, by the differential clocking circuitry, the input voltage and the switched voltage as inputs; providing, by the differential clocking circuitry, a first clocked signal and a second clocked signal as outputs; and determining, by phase comparator circuitry, a phase difference between the first clocked signal and the second clocked signal, the phase difference representing the difference between Vin and Vsw; and
wherein the phase comparator circuitry comprises a first plurality of D flip flops and a second plurality of offset circuitries, each of offset circuities in the second plurality of offset circuitries configured to incrementally add additional delay to the first clocked signal prior to provision of a respective delayed clock signal to a respective D flip flop.

9. The method of claim 8, further comprising setting, by the switch controller circuitry a dead time to the estimate in a same PWM (pulse width modulation) cycle as the estimated dead time interval was determined, wherein the estimated dead time is determined as T=Cpar*Vin/$I_{L,max}$, and $I_{L,max}$ corresponds to the maximum inductor current just prior to the first switch turning off, $I_{L,max}$ estimated based, at least in part, on the difference between Vin and Vsw.

10. The method of claim 8, wherein an output of the phase comparator circuity is a digital code corresponding to the phase difference.

11. The method of claim 8, further comprising determining, by the delay adjustment logic circuitry, whether the estimated dead time interval is greater than or less than an optimal dead time interval based, at least in part, on the switched voltage and based, at least in part, on a control input to the second switch.

12. The method of claim 11, further comprising detecting, by a NOR gate, whether the estimated dead time interval is greater than the optimal dead time interval and detecting, by an AND gate, whether the estimated dead time interval is less than the optimal dead time interval.

13. The method of claim 8, wherein a respective delay time of at least some offset circuitries of the plurality of offset circuitries is a respective whole number multiple of a delay increment $\Delta t$.

14. A system comprising:
DC to DC converter circuitry;
switch controller circuitry to control a conduction state of a first switch and a second switch in a DC to DC converter; and dead time logic circuitry to determine an estimated dead time interval between a turn off of the first switch and a turn on of the second switch, the first switch and the second switch coupled at a switched node, the estimated dead time interval determined based, at least in part, on a difference between an input voltage (Vin) and a switched voltage (Vsw) detected at the switched node just prior to turning off the first switch, wherein Vin and Vsw are differentially clocked by differential clocking circuitry in an apparatus; a parasitic capacitance (Cpar) associated with the switched node, wherein Cpar is estimated based on the apparatus configuration or by delay adjustment logic circuitry in the apparatus; and a maximum inductor current($I_L$,max), the difference between Vin and Vsw representing the maximum inductor current, wherein $I_{L,max}$ is determined based on a digital code generated by dead time calculation circuitry in the apparatus
wherein the dead time logic circuitry comprises the differential clocking circuitry and phase comparator circuitry, the differential clocking circuitry to receive the input voltage and the switched voltage as inputs and to provide a first clocked signal and a second clocked signal as outputs, a phase difference between the first clocked signal and the second clocked signal representing the difference between Vin and Vsw, the phase comparator circuitry to determine the phase difference,
wherein the phase comparator circuitry comprises a first plurality of D flip flops and a second plurality of offset circuitries, each of offset circuities in the second plurality of offset circuitries configured to incrementally add additional delay to the first clocked signal prior to provision of a respective delayed clock signal to a respective D flip flop.

15. The system of claim 14, wherein the estimated dead time interval is determined as T=Cpar*Vin/IL,max, wherein IL,max corresponds to the maximum inductor current just prior to the first switch turning off, and $I_{L,max}$ is estimated based, at least in part, on the difference between Vin and Vsw and the switch controller circuitry is to set a dead time to the estimate in a same PWM (pulse width modulation) cycle as the estimated dead time interval was determined.

16. The system of claim 14, wherein an output of the phase comparator circuitry is a digital code corresponding to the phase difference.

17. The system of claim 14, wherein the switch controller circuitry further comprises the delay adjustment logic circuitry to determine whether the estimated dead time interval is greater than or less than an optimal dead time interval based, at least in part, on the switched voltage and based, at least in part, on a control input to the second switch.

18. The system of claim 17, wherein the delay adjustment logic circuitry comprises a NOR gate to detect whether the estimated dead time interval is greater than the optimal dead time interval and an AND gate to detect whether the estimated dead time interval is less than the optimal dead time interval.

19. The system of claim 14, wherein, a respective delay time of at least some offset circuitries of the plurality of offset circuitries is a respective whole number multiple of a delay increment $\Delta t$.

* * * * *